US005925136A

United States Patent [19]

Watts, Jr.

[11] Patent Number: 5,925,136
[45] Date of Patent: Jul. 20, 1999

[54] DIFFERENCE CAPTURE TIMER

[75] Inventor: Charles E. Watts, Jr., Crowley, Tex.

[73] Assignee: Fairchild Semiconductor Corporation, So. Portland, Me.

[21] Appl. No.: 09/032,901

[22] Filed: Mar. 2, 1998

[51] Int. Cl.$^{6}$ .................... G06F 1/04

[52] U.S. Cl. .................... 713/502

[58] Field of Search .................... 713/500, 502

[56] References Cited

U.S. PATENT DOCUMENTS

| | | | |
|---|---|---|---|
| 4,222,103 | 9/1980 | Chamberlin . | |
| 5,218,693 | 6/1993 | Ogita . | |
| 5,325,341 | 6/1994 | Viot et al. . | |
| 5,633,895 | 5/1997 | Powell, II et al. | 375/324 |

*Primary Examiner*—Thomas M. Heckler
*Attorney, Agent, or Firm*—Pierce Atwood; Chris A. Caseiro

[57] ABSTRACT

A difference capture circuit for determining the duration of a digital signal pulse. The difference circuit includes a branch couplable to a standard counter for activating the counter to count as a function of a system clock pulse, and a triggering circuit couplable to a standard capture register for fetching the count from the counter. The difference capture circuit may be incorporated into standard timer unit circuitry and is designed to calculate the difference between either the rise and fall times for an incoming signal, or the rise to rise time of that signal. Adding the difference capture circuit to a timing unit eliminates the need to use RAM, and minimizes processor resources, in obtaining the timing associated with a signal change.

8 Claims, 1 Drawing Sheet

DIFFERENCE CAPTURE TIMER

BACKGROUND OF THE INVENTION

1. Field of the Invention

The present invention relates to devices used to determine the duty time and length of a digital signal. More particularly, the present invention relates to circuits used to measure the time difference between either the rising edge and falling edge or successive rise edges. The present invention provides a means for measuring that time difference with minimal processing by a host processor.

2. Description of the Prior Art

Digital computers are comprised of a variety of components designed to work together in a coordinated manner. The central processing unit, otherwise known as the microprocessor or microcontroller in small portable-type computers, is specifically designed to coordinate those various components. Such components include, but are not limited to, the Read-Only Memory (ROM), Random-Access Memory (RAM), various counters and registers, as well as interfaces for the transferral of information between the computer and external and internal systems. That information is embodied in digital signals. Those digital signals are characterized as pulses of varying duration. Given the well-known complexity associated with these systems, it is important that most computing systems include timing and related control circuitry to ensure that, among other things, the transfer of digital signals between the processor and external components remains coordinated.

While the processor is certainly the key component of any computing system designed to complete a task, timer circuitry is often necessary to coordinate activities associated with completing the task, particularly regarding the transfer of information related to external events. A generic timer of the type used in most processing systems includes a reload/counter, and a register for receiving information from the counter. The reload subcircuitry of the timer is generally used to time the transmission of data out from the processor and is only of peripheral interest in regard to the present invention.

The counter component of the timer is typically designed to count the on-going number of pulses associated with a signal of fixed frequency—generally provided by a system clock that maintains a signal of well-defined frequency. The pulses are designed to be associated with a particular event in that the number of pulses can be used to time the beginning and ending of an event. The register latches or captures the count information from the counter when requested to do so by the processor. That is, the processor enables the capture register, by sending a triggering signal related to a particular incoming signal, and thereby spurs the register to fetch from the counter the count value at that time. The triggering occurs at the outset of a triggering event or set of events—such as a rising edge associated with the initiation of an event, and then a falling edge indicating the end of the event—of an incoming signal for which a duration is to be obtained.

The duration of interest is commonly the difference between the rising edge and the falling edge of that incoming signal. It may, however, be the difference in time from a rising edge to the next successive rising edge, when the time for a complete cycle of the incoming signal is to be obtained. Defining the duration of that signal of interest enables the controller to coordinate the transfer of the information associated with that signal, or to otherwise manipulate that signal. Inaccuracy in the measurement of signal duration will of course adversely affect the transfer and/or manipulation of the associated information. One example of an event for which timing accuracy is important is a remote vehicle-speed-measurement system. The first event would be the indication that the vehicle had passed a first fixed location (the first event to be captured). The second event would be the vehicle's passing of a second fixed location (the second event to be captured). A system timer would be used to count the number of pulses between those two capture events, which count would be passed to the processor for manipulation to determine whether the vehicle had exceeded a speed limit. Of course, there are countless other examples of event timings of interest. In most such cases, it is important that the pulse count be accurate. Additionally, in order for this system to work, an initial predictable incoming event rate must be introduced such that the system clock and the frequency of the signal to be captured are aligned. That predictable value is event dependent and may be brief or extended.

In the prior-art systems, the counter, which may be a ripple or free-running counter for example, continues to count down (from FF for an 8-bit counter or from FFFF for a 16-bit counter for example) as a function of a triggering pulse associated with a rising edge of the signal from the system clock. When the capture register is triggered by the processing unit to fetch the counter value at the time of the triggering event associated with the incoming signal to be measured, the counter value at that moment is latched to the capture register. The capture register then transmits that count value to the processing unit which in turn transfers the information to RAM. The processing unit again triggers the capture register upon the occurrence of a second triggering event, either a falling edge of the incoming signal—for half-cycle-time measurement—or on the next rising edge—for full-cycle-time measurement. When that second triggering event occurs, the capture register is again enabled to fetch the count value at that time. The second count value is again transferred to RAM. The processor then performs a subtraction calculation to determine the number of cycles of the system clock that have passed during the duration of either the half cycle or full cycle of the incoming signal. That information is then used to calculate the difference between the two triggering events, or the duration of the event.

This method for obtaining event duration information has been the standard technique, although variants have been developed, apparently in order to increase time-difference measurement accuracy and consistency. In addition to one of the original ways for doing so, described in U.S. Pat. No. 4,222,103, issued to Chamberlin, a more recent technique is described by Ogita in U.S. Pat. No. 5,218,693. Unfortunately, as with all prior timing measurement systems, these particular systems require the use of valuable RAM space and valuable processor or controller processing resources in order to resolve the information twice obtained from the counter. It would be preferable if the timing component of the complete system could be used to obtain the incoming signal time difference so as to free up RAM space and to minimize processing resources of the controller. Therefore, what is needed is a timing system that includes circuitry for determining the difference between the rise and fall times, or the rise and rise times of digital signals. What is also needed is such a timing system that can be used to obtain information associated with incoming signal timing without using RAM and with minimal reliance upon a controller or processor to manipulate data to determine that difference.

SUMMARY OF THE INVENTION

It is an object of the present invention to provide a system for determining the difference between the rise and fall times, or the rise and rise times of digital signals. It is also an object of the present invention to provide a system to obtain such information without using RAM and with minimal reliance upon a controller or processor to manipulate data used to determine that difference.

These objectives are achieved in the present invention through the introduction of a difference circuit as part of a standard timing unit. The difference circuit, when enabled, identifies the rising edge of an incoming signal, triggers a counter, and halts that counter at either a falling edge or a following rising edge. The difference circuit includes counter-initiate sub-circuitry for coupling a system clock and an incoming signal to the counter. The difference circuit further includes triggering sub-circuitry that may be coupled either to the counter or to a standard capture register commonly available in many systems. The triggering sub-circuitry is designed to identify an incoming triggering event, such as either a falling edge or a following rising edge. The difference circuit provides a time difference value for a signal half-cycle when the triggering sub-circuitry is activated upon receiving an incoming falling edge. Similarly, the difference circuit provides a time difference value for a full-signal cycle when the triggering sub-circuitry is activated upon receiving an incoming following rising edge.

The difference circuit is designed to be coupled between standard input nodes of circuitry and a standard counter, such as an 8-bit or 16-bit counter, of the type commonly available for use with processors or controllers. The difference circuit may also be coupled to a standard register, identified as a capture register such as an 8-bit or 16-bit register. The register may be coupled to receive information from the counter, and to deliver that information to the controller. Alternatively, the counter information may be delivered directly from the counter to the controller, thereby eliminating the need of one or more gates for interfacing between the counter and the capture register. Nevertheless, since counters and registers are often found as part of generic microprocessor circuitry, it is possible in the present invention to put them both to use in determining the timing of an incoming signal. It is to be noted that the difference circuit is also coupled to a system clock that provides a keying signal rate used as the basis for determining the time difference for the incoming signal. The system clock may be any type of external clocking device, such as an off-chip crystal oscillator set to a fixed or selectable frequency.

The difference circuit of the present invention is advantageous over the prior means for defining the duration of an incoming signal in that it does not require data manipulation by the controller. Instead, the difference circuit provides a direct measure of the duration based on the system clock frequency. Specifically, the clock pulse is coupled to the counter-initiate sub-circuit in a way that permits the counter to record every positive-going change of the clock pulse—when the counter-initiate sub-circuit is enabled. The counter-initiate sub-circuit is enabled by a positive-going pulse of the input signal to be measured. So long as the input signal remains high or otherwise positive, the frequency defines the time difference measurement. When the input signal falls, the triggering sub-circuit enables the capture register to read the count value in the counter associated with the pulsing of the system clock. This relates to the duration of the input signal as it transitions from a high to a low. Alternative, if the triggering sub-circuit is configured to enable the determination of the duration of the input signal as it transitions from high to low and back to high, the triggering sub-circuit enables the capture register to read the count value from the counter when the input signal rises for a second time.

The following illustration summarizes how the difference circuit of the present invention automatically determines the duration of an input signal. As a simplified example, if the triggering circuit is enabled to trigger based on a high-to-low input signal transition, and if the system clock operates at 1 μsec, a count of 10 system clock pulses relates to an input signal frequency of 20 μsec. Similarly, with triggering based on the high-to-low-to-high transition for the same clock frequency, a 10 count relates to an input signal frequency of 10 μsec. The count value recorded in the counter and/or the capture register is then transmitted to a bus for delivery to the processor. Using the circuitry of the present invention it is no longer necessary to take up valuable RAM space. Further, it is no longer necessary to occupy the processor with the task of retrieving the data in RAM associated with the captured rising edge counts, retrieving the data in RAM associated with the captured falling edge counts, and then calculating that difference. Instead, the processor is simply required to relate the single captured count to the system clock frequency to fix the duration of either the complete input signal cycle, or half of that cycle.

These and other advantages of the present invention will become apparent upon review of the following detailed description of the preferred embodiment of the present invention, the accompanying drawing, and the appended claims.

DETAILED DESCRIPTION OF THE PREFERRED EMBODIMENT

Figure 1:
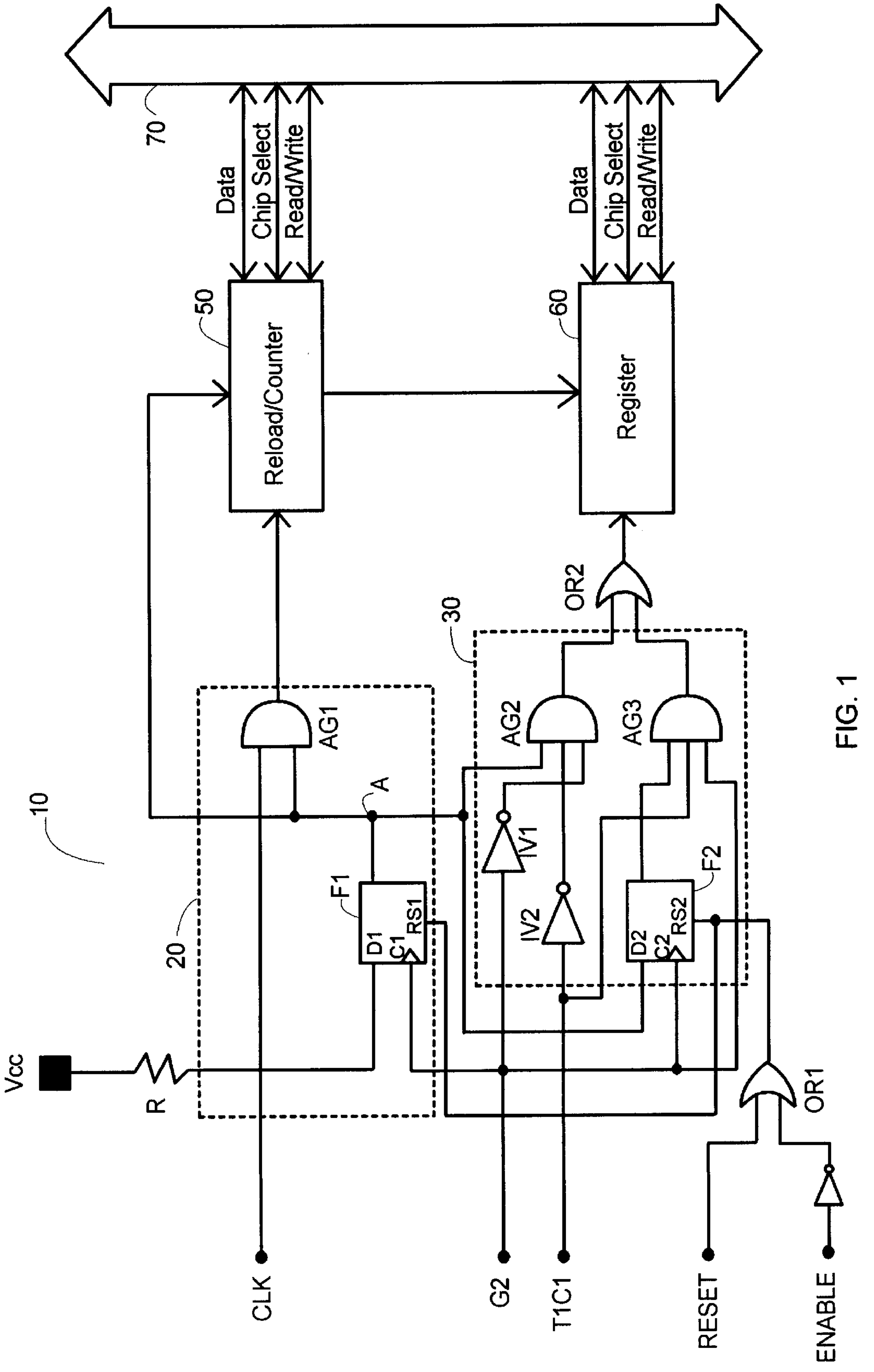
FIG. 1 is a simplified schematic diagram of the difference circuit of the present invention in context.

As illustrated in FIG. 1, a difference circuit 10 of the present invention includes a counter-initiate circuit 20 and a trigger circuit 30. The difference circuit 10 is designed to be coupled to standard inputs, including a system clock input CLK; a signal input G2 that is the node for an incoming signal, the duration of which is to be measured by the difference circuit 10; a trigger-defining input T1C1 that may be programmed to activate the trigger circuit 30 on either a HIGH (up) or LOW (down) signal transmitted thereto by a processor; and a reset input RESET. Additionally, another standard supplemental input node, identified as ENABLE, is coupled to the processor and may be used to activate the difference circuit 10 when desired. The RESET and ENABLE nodes are ORed together at OR gate OR1 so as to provide an output designed to activate the counter-initiate circuit 20 and the trigger circuit 30 in a manner to be described herein. The difference circuit 10 is coupled between those standard nodes and a counter 50 and a capture register 60. The counter 50 and the register 60 are preferably 16-bit devices for recording signal information and interfacing with the processor via interface bus 70. The processor may be any sort of microcontroller including, but not limited to, 8-bit, 16-bit, or 32-bit microprocessors. The counter 50, register 60, bus 70, and processor (not shown) are all standard computing devices well known to those skilled in the art. Generally, 8-bit buses couple Data lines between the counter 50 and the processor as well as between the register 60 and the processor. Chip select and Read/Write lines complete the interfacing, as is well known in the design of such systems.

In the preferred embodiment of the invention, the counter-initiate circuit 20 includes a flip-flop F1 and AND gate AG1. Flip-flop F1 is preferably a positive-edge-triggered D-type flip-flop, although any other flip-flop suitable to perform the function to be described herein may be employed. Flip-flop F1 includes a D input D1 coupled to a high-potential source Vcc, preferably via resistor R, acting as a voltage divider, so that the potential of input D1 is always biased HIGH. Flip-flop F1 also includes a clocking input C1 that is the F1 flip-flop-activating node coupled to signal input G2. Flip-flop F1 further includes a reset switch RS1 that is coupled to the enabling output of OR gate OR1. The output of F1, identified at node A, is a first input to gate AG1 . The signal at node A is also coupled to a standard capture timer reload circuit RELOAD that may form a part of the counter 50 subcircuitry and that is used to set the count-start value of the counter 50 when the difference circuit 10 is activated. In particular, when the signal at node A is HIGH, the RELOAD subcircuitry sets the counter 50 value to 0 in a manner well known to those skilled in the art, while a LOW at node A causes the counter 50 to be reset to 00, or 0000, depending upon whether the counter 50 is an 8-bit or a 16-bit counter. The AND gate AG1 of the counter-initiate circuit 20 includes the first input from F1 via node A, and a second input coupled directly to the system clock CLK. The signal resulting from the ANDing of those two inputs is transmitted to counter 50 such that each HIGH signal from AG1 is a count used to identified the time associated with the input signal at G2.

The trigger circuit 30 of the difference circuit 10 preferably includes a second flip-flop F2, two inverters, IV1 and IV2, two AND gates, AG2 and AG3, and an OR gate OR2. Flip-flop F2 is preferably also a positive-edge-triggered D-type flip-flop, although any other flip-flop suitable to perform the function to be described herein may be employed. Flip-flop F2 includes a D input D2 coupled to node A of flip-flop F1, so that the potential of input D2 follows the output of F1 when that flip-flop is activated. Flip-flop F2 also includes a clocking input C2 that is the F2 flip-flop activating node coupled to signal input G2. Flip-flop F2 further includes a reset switch RS2 that is coupled to the enabling output of OR gate OR1. The output of F1, identified at node B, is a first input to gate AG3, one of the two gates used to trigger the capture register 60 to retrieve the count from counter 50 when either a falling edge or a second rising edge is received from input G2. Inverter IV1 is coupled between signal input G2 and AND gate AG2 and may be any sort of inverter, including, but not limited to a complementary pair of MOS transistors. Inverter IV2 is coupled between trigger-defining input T1C1 and AND gate AG2 and may also be any sort of inverter, including, but not limited to a complementary pair of MOS transistors.

AND gate AG2 includes three inputs: the output from flip-flop F1, the inverted signal input from node G2, and the inverted input from node T1C1. AND gate AG3 also includes three inputs: the output from flip-flop F2, the non-inverted signal input from node G2, and the non-inverted input from node T1C1. The outputs of those two AND gates are then ORed at gate OR2 such that when either one of the AND gates pulses a triggering signal indicating a change in the input signal at G2, the capture register 60 will retrieve the count from the counter 50. Of course, the AND gate tied to gate OR2 that activates the capture register 60 is dependent upon the signal at trigger-defining node T1C1.

The difference circuit 10 of the present invention operates as follows. When the processor is initially turned on, or when there is some change in the state of system power that causes the signal on the RESET node to go HIGH—all independent from the processor—the difference circuit 10 is initialized by the activation of flip-flops F1 and F2 at nodes RS1 and RS2, respectively. Alternatively, if the processor is operational and there is an interest in retrieving the timing associated with a particular signal, a difference-circuit-enable signal is transmitted to the difference circuit at node ENABLE. Thus, a HIGH signal at either the RESET node or the ENABLE node will reset flip-flops F1 and F2. With the flip-flops active, node D1 of flip-flop F1 will be HIGH, given its coupling to Vcc. However, until a rising edge is received at node C1 , via node G2, flip-flop F2 will not be operational. Therefore, node A will initially be off, and so node D2 of flip-flop F2 will also be off.

It is to be noted that, at all times, the second input to AND gate AG1 is moving between HIGH and LOW as a function of the frequency of the system clock rate as transmitted to the CLK node. A counting clock pulse is only delivered from gate AG1 to the counter 50 when that second input and the input from node A are HIGH. That occurs when flip-flop F1 is turned on by the triggering event of a rising edge at node G2. Each HIGH pulse of the system clock at node CLK results in a count of one within the counter 50, provided flip-flop F1 is transmitting a HIGH signal as well. Moreover, if counter 50 is a downward-counting counter, when node A initially goes HIGH, the reload circuit RELOAD reverses the counter's ordinary downward counting operation so that it is forward counting. The RELOAD circuit further initializes the counter 50 to zero so that each HIGH pulse of the system clock adds one to the existing counter value.

It is to be understood that the initial turning on of flip-flop F2, like the initializing of flip-flop F1, occurs with the introduction of a rising-edge signal from node G2 to node C2. However, since at the time of that triggering node D2 is at a LOW potential, the initial output from flip-flop F2 at node B will also be LOW and, therefore, gate AG3 cannot be used to trigger the capture register 60. Therefore, given the characteristics of the D-type flip-flops preferred in the difference circuit 10 of the present invention, flip-flop F2 will only output a HIGH signal at the next triggering condition when the input signal at G2 transmits a second rising edge.

In describing the operational effects of flip-flop F2 and gates AG2 and AG3, and as previously indicated, it is important to note that the event that is used to define the duration of the pulse at G2 to be measured is selectable. That is, the processor may be programmed to set the value of the signal at trigger-defining node T1C1 to be either HIGH or LOW. If it is set to be HIGH, the duration of the signal at G2 is measured by the difference circuit 10 between the input signal's rising edges. That is, the counter continues to count system clock pulses until it is triggered off at the next rising signal. If T1C1 is set LOW by the processor, the duration of the signal at G2 is measured by the difference circuit 10 between the rising and falling edges of the signal. That is, the counter is operable until the falling edge is identified.

Assuming that T1C1 is set HIGH, AND gate AG3 will provide the triggering signal to the capture register 60 via OR gate OR2. As can be seen from FIG. 1, that will occur on the second rising edge of the signal from node G2, when the output of flip-flop F2 to gate AG3 will then be HIGH, and the direct couplings of HIGH signals from G2 and T1C1 will trigger a clocking pulse from AG3 to OR2. Prior to that second rising pulse, gate AG3 will not be enabled to transmit such a pulse. Additionally, gate AG2 will not be enabled to transmit a triggering pulse to OR2 because inverter IV2 will force the fixed HIGH signal at T1C1 to be delivered to gate AG2 as a LOW signal.

For T1C1 set LOW by the processor, gate AG2 becomes the triggering mechanism for the capture register 60 to be activated because there will remain a LOW input to gate AG3. As can be seen from FIG. 1, the triggering will occur when there is a falling edge at signal input node G2. When that event occurs, inverter IV1 will switch the LOW G2 signal HIGH, inverter IV2 will keep fixed LOW T1C1 signal HIGH at the input to gate AG2, and the HIGH output from flip-flop F1 completes the ANDing at that gate necessary to trigger through gate OR2 the activation of the capture register 60. Of course, when the capture register 60 is activated, it reads the count from the counter 50 in a manner well known to those skilled in the art. Preferably, the data is transferred via a 16-bit parallel bus.

It should be understood that the preferred embodiment mentioned herein is merely illustrative of the present invention. Numerous variations and equivalents in design and use of the present invention may be contemplated in view of the following claims without straying from the intended scope and field of the invention herein disclosed.

I claim:

1. A difference capture circuit for obtaining the duration of a digital signal pulse characterized by a first event and a second event, said difference capture circuit including an incoming signal node for receiving the digital signal pulse, said difference capture circuit comprising:

a. a counter-initiate circuit coupled between said incoming signal node and a counter, wherein the counter is coupled to a system clock; and b. a triggering circuit coupled between said incoming signal node and a capture register, wherein the first event activates said counter-initiate circuit such that the counter begins to count pulses associated with the system clock, wherein the second event activates said triggering circuit such that said capture register fetches a count from the counter upon the occurrence of the second event, and wherein the count fetched from the counter is directly related to the difference in time between the first event and the second event.

2. The difference capture circuit as claimed in claim 1 wherein the first event is a rising edge of the digital signal pulse and the second event is a falling edge of the digital signal pulse, said triggering circuit further comprising a falling-edge branch for triggering the capture register to fetch the count from the counter upon receiving the falling edge at said incoming signal node.

3. The difference capture circuit as claimed in claim 1 wherein the first event is a first rising edge of the digital signal pulse and the second event is a second rising edge of the digital signal pulse, said triggering circuit further comprising a rising-edge branch for triggering the capture register to fetch the count from the counter upon receiving the second rising edge at said incoming signal node.

4. The difference capture circuit as claimed in claim 1 wherein said counter-initiate circuit includes a counter-initiate flip-flop coupled to said incoming signal node, and a counter-initiate AND gate having a first input coupled to the system clock and a second input coupled to an output of said counter-initiate flip-flop, wherein an output of said counter-initiate AND gate is a triggering input to the counter.

5. The difference capture circuit as claimed in claim 4 wherein said triggering circuit includes:

a. a trigger flip-flop coupled to said incoming signal node;

b. a first trigger AND gate having a first input coupled to said output of said counter-initiate flip-flop, a second input coupled to said incoming signal node, and a third input coupled to a trigger input node; and c. a second trigger AND gate having a first input coupled to an output of said trigger flip-flop, a second input coupled to said incoming signal node, and a third input coupled to said trigger input node.

6. The difference capture circuit as claimed in claim 5 wherein an output of said first trigger AND gate and an output of said second trigger AND gate are coupled to the capture register through an OR gate.

7. The difference capture circuit as claimed in claim 6 with said triggering circuit further comprising a first inverter coupling said incoming signal node to said first trigger AND gate and a second inverter coupling said trigger input node to said first trigger AND gate.

8. The difference capture circuit as claimed in claim 1 further comprising a reload circuit between said counter-initiate circuit and the counter, wherein said reload circuit sets the count of said counter to zero when there is no output from said counter-initiate circuit, and said reload circuit sets the counter for counting upward from zero when output from said counter-initiate circuit is logic HIGH.

* * * * *